US010030999B2

(12) United States Patent
Fabbri et al.

(10) Patent No.: US 10,030,999 B2
(45) Date of Patent: Jul. 24, 2018

(54) OPTOELECTRONIC SENSOR FOR DETECTING FEATURES OF AN OBJECT

(71) Applicant: DATALOGIC IP TECH S.R.L., Lippo di Calderara di Reno (IT)

(72) Inventors: Alberto Fabbri, Bazzano (IT); Maurizio Brancaleoni, Castenaso (IT); Andrea Locarni, San Lazzaro di Savenda (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 113 days.

(21) Appl. No.: 14/431,836

(22) PCT Filed: Sep. 26, 2013

(86) PCT No.: PCT/IB2013/058873
§ 371 (c)(1),
(2) Date: Mar. 27, 2015

(87) PCT Pub. No.: WO2014/049544
PCT Pub. Date: Apr. 3, 2014

(65) Prior Publication Data
US 2015/0268067 A1     Sep. 24, 2015

(30) Foreign Application Priority Data

Sep. 27, 2012  (IT) .............................. MO2012A0235

(51) Int. Cl.
| G01D 5/34 | (2006.01) |
| G01D 5/347 | (2006.01) |
| G01S 17/02 | (2006.01) |

(52) U.S. Cl.
CPC .......... *G01D 5/3473* (2013.01); *G01S 17/026* (2013.01)

(58) Field of Classification Search
CPC .. G01D 5/3473; G01D 5/347; G01D 5/34776; G01S 17/026
See application file for complete search history.

(56) References Cited

U.S. PATENT DOCUMENTS

| 4,282,430 A | 8/1981 | Hatten et al. |
| 5,627,531 A | 5/1997 | Posso et al. |
(Continued)

FOREIGN PATENT DOCUMENTS

| EP | 2221643 A2 | 8/2010 |
| JP | 07301740 A | 11/1995 |

OTHER PUBLICATIONS

Office Action dated Feb. 14, 2018 in European Patent Application No. 13801790.0, 4 pages.

*Primary Examiner* — Tony Ko
(74) *Attorney, Agent, or Firm* — Shook, Hardy & Bacon, L.L.P.

(57) ABSTRACT

An optoelectronic sensor for detecting features of an object comprises means for controlling the operation of said sensor and a face for interaction with an operator provided with adjusting means for adjusting operating parameters of the sensor. The means for controlling is connected to the adjusting means to detect a setting of the operating parameters, and the adjusting means comprises a knob, which is rotatable around an axis for adjusting at least one predetermined parameter among operating parameters. The sensor comprises a multiturn encoder that is actuatable by the knob, and the means for controlling are connected to the multiturn encoder to obtain a rotation mode of said knob, for example a rotation direction and/or a rotation speed, so as to associate with said detected rotation mode a corresponding setting mode of the predetermined parameter, for example a setting with a first coarse sensitivity, or a second fine sensitivity.

21 Claims, 6 Drawing Sheets

(56) References Cited

U.S. PATENT DOCUMENTS

| | | | | |
|---|---|---|---|---|
| 6,348,772 B1* | 2/2002 | May | ................ | B60K 37/06 |
| | | | | 200/314 |
| 7,141,748 B2* | 11/2006 | Tanaka | .............. | H01H 9/181 |
| | | | | 200/310 |
| 9,662,983 B2* | 5/2017 | Holl | ................ | G06F 3/0308 |
| 2006/0139907 A1 | 6/2006 | Yen | | |
| 2006/0227454 A1* | 10/2006 | Ruettiger | ........... | G05G 1/02 |
| | | | | 360/97.11 |

* cited by examiner

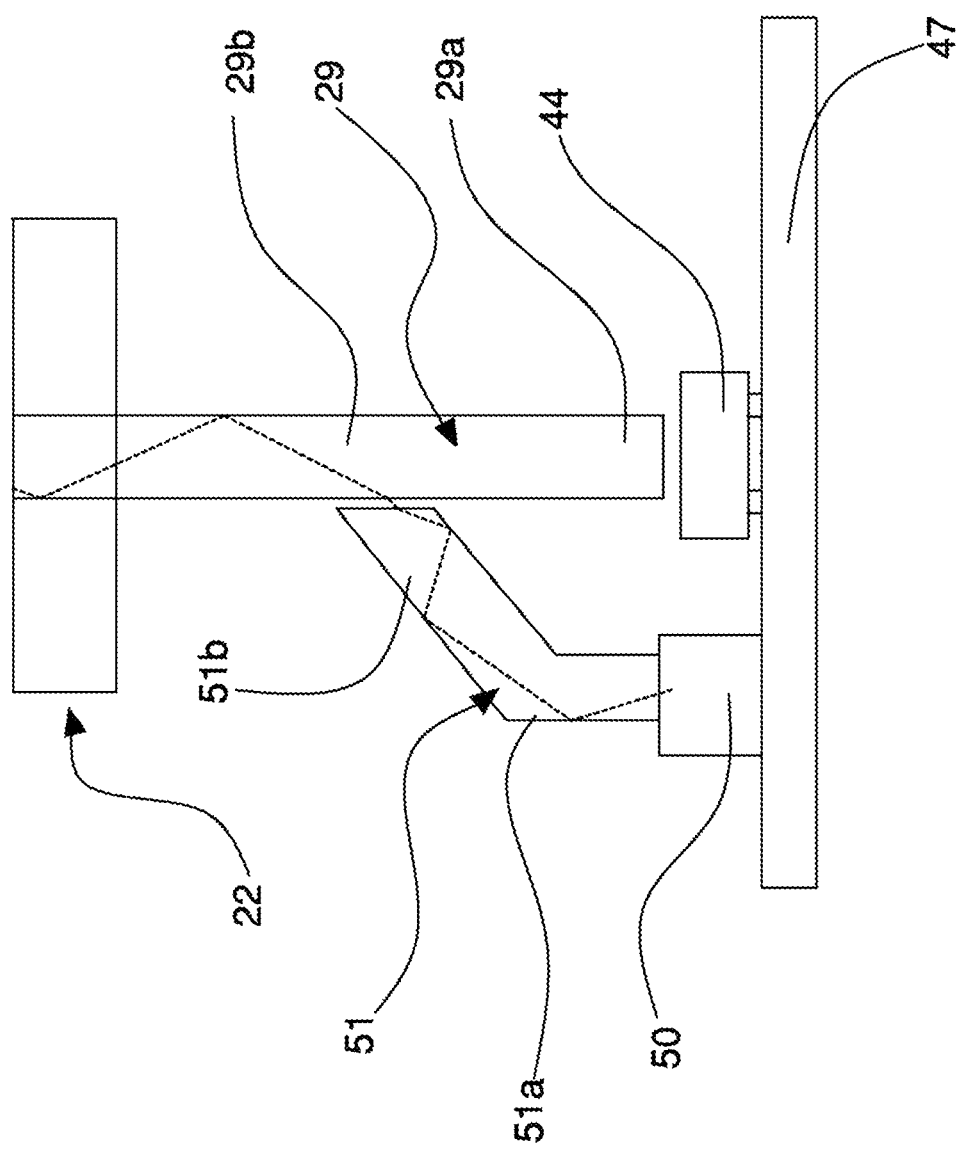

OPTOELECTRONIC SENSOR FOR DETECTING FEATURES OF AN OBJECT

CROSS-REFERENCE TO RELATED APPLICATIONS

This application claims priority under 35 U.S.C. § 365 to PCT/IB2013/058873, which was filed on Sep. 26, 2013, which claims the benefit of the filing date under 35 U.S.C. § 365 to MO2012A000235, which was filed on Sep. 27, 2012 in Italy. The entirety of the aforementioned applications are incorporated by reference herein.

TECHNICAL FIELD

The present invention relates to an optoelectronic sensor for detecting one or more features of an object. In particular, the present invention relates to the setting mode of operating parameters of an optoelectronic sensor.

BACKGROUND

Optoelectronic sensors have been used for some time in the sector of industrial automation, packaging machines or food industry to detect a feature of an object.

Different types of optoelectronic sensors exist, each type being specialised in a specific application or for detecting a specific feature of an object positioned within a range of operating distances. For example, optoelectronic sensors are known that are able to detect the presence of an object and/or the colour thereof. Other types of sensor are known for detecting light areas in an object and/or for detecting the presence of an object within a preset operating "field".

One or more operating parameters are associable with each sensor and determine the functions thereof, in the sense that the value of each parameter determines the behaviour of the sensor during a work step. Nevertheless, it is not often possible to preset the value of such parameters at the moment of production of the sensor because adjusting some of them depends on the particular mode of use of the sensor in the application of interest. Accordingly, each installation of the sensor is typically preceded by an adjusting procedure performed by an operator, by means of which the value of one or more parameters for the specific application is set.

By way of example, let us consider an optoelectronic sensor, which is typically called a "background suppressor", is able to detect the presence of an object inside a measuring "field" that is usually used to detect the presence of an object conveyed on transport chains or on conveyor belts. The measuring field is a range of preset distances comprised between the background suppressor device and a preset limit distance (also called the cut-off distance), beyond which the presence of any object is ignored, which thus becomes part of the "background". At the output, the sensor supplies an information signal indicating the presence or absence of an object within the cut-off distance. The cut-off distance is not in general presettable a priori but is an operating parameter regulated by an operator during installation of the sensor in relation to the position in which the background is located, which may, for example, comprise a wall of the conveyor or the conveyor itself.

The output information signal that the sensor provides is a digital signal that may assume a high or low logic status to indicate respectively the presence or absence of the object. If the sensor is set to a mode defined as "light" the information signal is a normally low digital signal that switches and becomes high in the presence of the object. On the other hand, if the sensor is set to "dark" mode the information signal is a normally high digital signal that switches and becomes low in the presence of the object. Similarly to the cut-off distance, the "light" or "dark" mode is a further operating parameter that is modifiable by the operator to define the activating logic status of the information signal.

FIG. 1 shows an optoelectronic sensor 1, in particular a background suppression sensor, according to the prior art. In order to enable the cut-off distance and the light/dark mode to be adjusted, a face of head 2 of the sensor acts as an operator panel and comprises interface means to interface an operator with the sensor. The interface means comprises indicator means, which are typically made by means of a green LED 3 and a yellow LED 4, which are suitable for indicating to an operator respectively the presence of power supply and the active logic state of the output. The yellow LED 4 lights up if the digital information signal is active and thus in the presence of the object.

The interface means further comprises adjusting means made by trimmers, proved with a slit so as to be able to be rotated by screwdriver. A trimmer is an adjustable resistive divider that provide an output voltage that is proportional to the position of an actuating shaft. Both two-position mono-turn trimmers and multiturn trimmers are known, which permit several rotations of the actuator shaft up to a maximum number of possible revolutions.

In the case of the background suppression sensor shown in FIG. 1, the adjusting means comprises a multiturn trimmer 5 for adjusting the cut-off distance, and a two position light/dark trimmer for configuring the information signal. Means for controlling the sensor is connected to the adjusting means and to the indicating means, to store the parameters set by means of the cut/off trimmer 5 and the light/dark trimmer 5 and for managing LEDs 3 and 4.

A bottom face 7 of the sensor is provided with connector means 8 for connecting and integrating the sensor 1 with an external automation and/or control system (not shown), that is able to receive the output information signal supplied by the sensor 1 and to configure the sensor 1 appropriately if requested.

Although what has been disclosed before relates to a background suppression sensor, interface means comprising trimmer adjusting means is found in many types of optoelectronic sensors. If it is necessary to adjust the parameters in which the settable value is comprised in a range of possible values, knob multiturn trimmers have been used above all.

Nevertheless, the presence of multiturn trimmers in an optoelectronic sensor poses certain problems.

First of all, the number of revolutions of the trimmer and the number of adjusting ranges for each revolution determines the adjusting sensitivity of the trimmer, given by the number of revolutions multiplied by the adjusting ranges for each revolution.

In the case of parameters whose values are variable in a large range and considering the high-performance multiturn trimmers currently on the market, i.e. with the maximum number of revolutions, it is often not possible to set the value of a parameter with the required sensitivity.

Further, the higher the number of possible revolutions in a trimmer, the greater are the cost and dimensions of the trimmer. The dimension of the trimmer imposes constructional constraints on the optoelectronic sensor and this is often translated into an undesired increase in the dimensions of the optoelectronic sensor. The limited dimensions in fact make the sensor very appreciated commercially and this is valid for all the types of optoelectronic sensors.

Alternatively, in order to obtain an adjustment of a parameter in a large range, it is possible to provide the optoelectronic sensor of two multiturn trimmers of medium performance, a first trimmer intended for low sensitivity variations and a second intended for high sensitivity variations. Again, a solution of this type involves high costs and imposes constructional constraints on the optoelectronic sensor. A dual knob interface is in fact necessary and an external container of dimensions that are suitable for housing the body of the two trimmers.

From what has been said before it follows that for each type of optoelectronic sensor, or also for each model of sensor with particular technical features, a specific design is necessary to equip the model with the most suitable multiturn trimmer whilst taking account of production costs and ensuring limited dimensions. In the case of a company manufacturing different types of optoelectronic sensors, the need for this design implies a cost increase not only in terms of human resources used but also type of componentry required in the warehouse. In other words, it is almost impossible to have standard componentry in order to achieve economies of scale.

A further problem of optoelectronic sensors is linked to the number of visual indicators present in the face of the sensor acting as an operator panel. Some types of sensor in fact, or some specific applications thereof, would require additional visual indicators to indicate specific use configurations. A solution of this type not only requires the visual indicators to be multiplied, with a consequent increase of costs, but also requires the sensor to be modified over time if a new sensor function has been identified with which no corresponding visual indicator has yet been associated. In addition, the multiplication of the visual indicators is not often possible in an optoelectronic sensor, especially if there are knobs of monoturn or multiturn trimmers present, inasmuch as the dimensions of the face with the function of operator panel would increase in an undesired manner.

BRIEF SUMMARY

The object of the present invention is to make an optoelectronic sensor that is free from the drawbacks disclosed above, in particular a sensor that enables the value of a parameter to be set with the required sensitivity, whilst using componentry that is as standard as possible in order to reduce production costs.

A further object of the present invention is to make a visual signal available that does not require additional visual indicators.

This object and still others are all achieved by an optoelectronic sensor according to one or more of the claims set out below.

BRIEF DESCRIPTION OF THE DRAWINGS

The invention can be better understood and implemented with reference to the attached drawings that illustrate one embodiment thereof by way of non-limiting example, in which:

FIG. 6 shows a schematic section view with parts removed for clarity of a still further embodiment of the optoelectronic sensor according to the invention.

DETAILED DESCRIPTION

Figure 1:
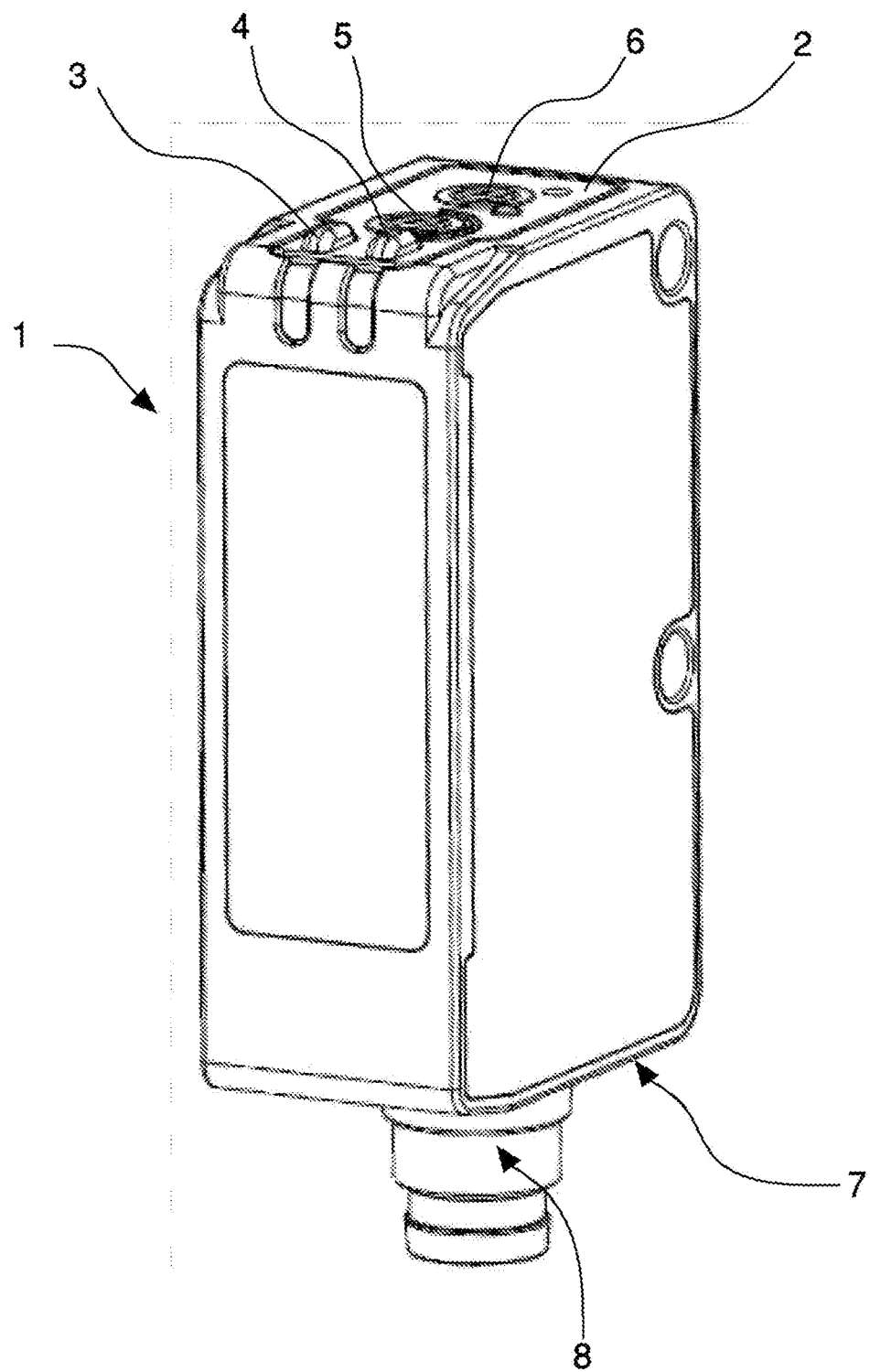
FIG. 1 shows a perspective view of a prior-art optoelectronic sensor.
Figure 2:
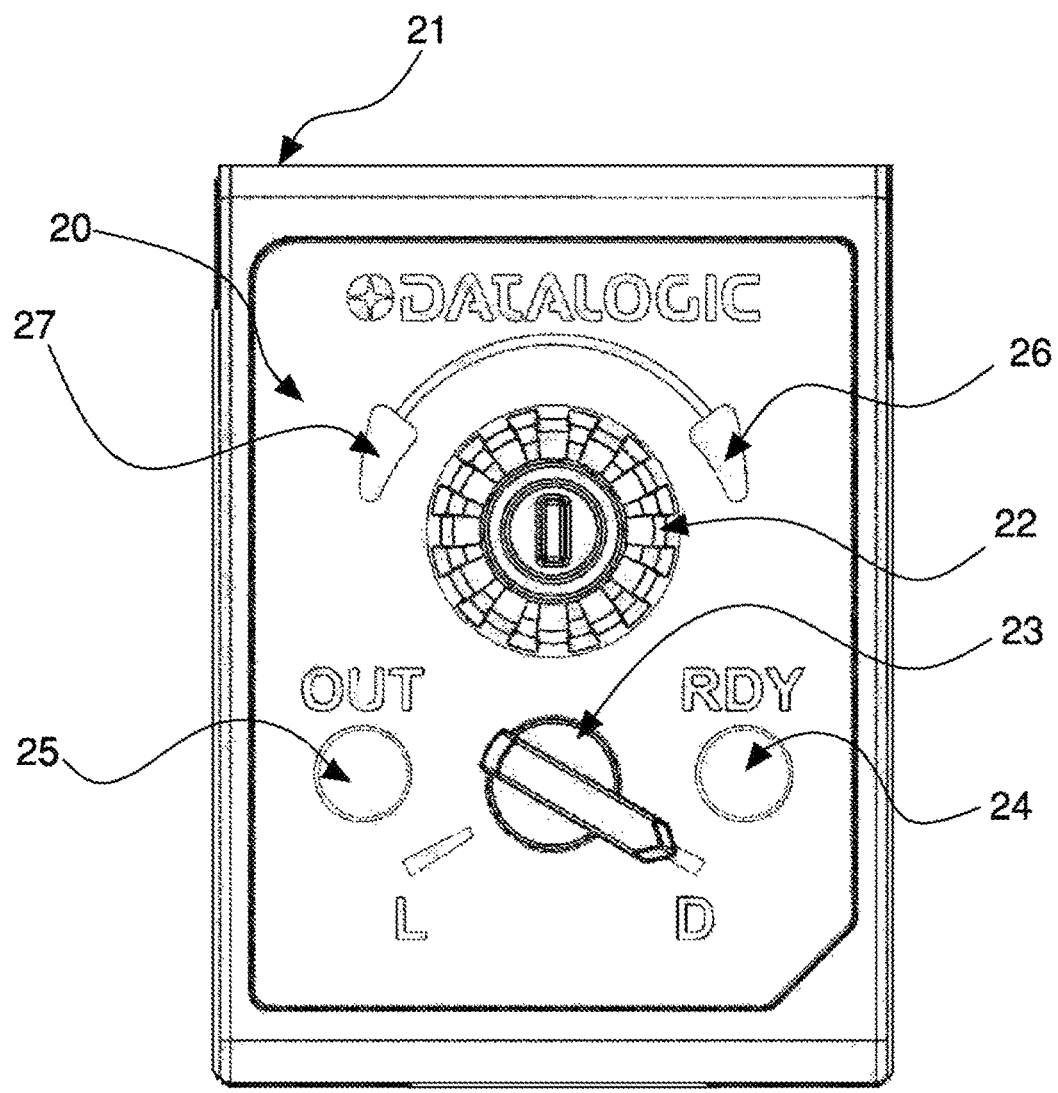
FIG. 2 shows a front view of a face that acts as an operator panel of an optoelectronic sensor according to the invention.

FIG. 2 shows a face 20 of an optoelectronic sensor according to the invention, not shown entirely, that is suitable for detecting one or more features of an object. The face 20 is part of an external container 21 of the sensor, indicated in FIGS. 2, 4 and 5.

The face 20 acts as a panel for interacting with an operator and is provided with adjusting means for adjusting operating parameters of the sensor. The sensor further comprises means (not shown) for controlling the operation of the sensor, which is connected to this adjusting means to detect a setting of the operating parameters. The means for controlling is also suitable for configuring the sensor appropriately when required, as will be seen in detail below.

The adjusting means comprises a knob 22, rotatable around an axis A, that is suitable for adjusting a predetermined parameter chosen from the operating parameters of the sensor, and a light/dark selector 23 for setting an output information signal. The meaning of the light/dark selector has already been disclosed previously and will not be repeated here.

The face 20 further comprises indicating means made by a first light emitter 24 and a second light emitter 25, suitable for indicating to an operator respectively the presence of the "RDY" power supply and the active logic of the "OUT" output. The light emitter 25 lights up if the digital information signal is active and thus in the presence of the object.

The indicating means further comprises two additional light emitters, shown in the face 20 as arrows 26 and 27, to indicate a rotation direction during setting of the predetermined parameter. The arrows 26 and 27 are made in the face 20 as a zone of a transparent material.

As shown in FIG. 2, the sensor comprises a multiturn encoder 28, that is actuatable by the knob 22 as will be specified better below.

The controlling means is connected to the multiturn encoder 28 in a manner that is not shown to detect a rotation mode of the multiturn encoder 28 so as to associate with this detected rotation mode, for example a rotation direction or a rotation speed, a corresponding setting mode of the predetermined parameter.

A multiturn encoder is a commercial component that is easily obtained and is inexpensive that comprises an angular position transducer that transforms a rotation into an analog or digital electric voltage signal. The multiturn encoder is not limited to a preset number of revolutions and the output provides an angular position and a rotation speed of a rotated disc.

Also mechanically retained multiturn encoders are available commercially that are triggered at each turn adjustment interval. An operator thus has a tactile return available for evaluating the size of the rotation and thus the adjustment that he or she is carrying out.

The number of revolutions on which to distribute the rotation and the number of adjustment intervals for each revolution are configurable parameters of a multiturn encoder.

It follows that at the moment at which the multiturn encoder 28 according to the present invention is connected to the controlling means of the optoelectronic sensor, the number of revolutions and the number of adjustment intervals of the multiturn encoder 28 are parameters that are configurable by the controlling means.

In addition, an optoelectronic sensor also comprises wireless or cable connecting means for connecting and integrating the sensor with an external automation and/or control system (not shown). Communication between the automation system and the sensor is provided by the controlling means, which is suitable for receiving data reading requests from the sensor and/or requests for setting data in the sensor. It follows that such configurable parameters of the multiturn encoder 28 that are settable by the controlling means and are stored therein can be received by this automation system.

As has been said, the knob 22 adjusts a predetermined parameter, chosen from the operating parameters of the sensor. In addition, the sensor is configurable for adjusting via the knob 22 also a further predetermined parameter among the operating parameters of the sensor, associated with the predetermined parameter. Adjustment of the parameter or of the further predetermined parameter is alternatively selectable by the rotation mode of the knob 22 by means of which it is further also possible to select the desired setting mode for the parameter or the further parameter. This setting mode will be shown better below.

Below, a list has been drawn up of possible parameters that are adjustable by a multiturn encoder that are distinguishing of all the different types of optoelectronic sensors. Nevertheless, it is pointed out that the typical operating parameters of a sensor or of a type of sensor that are adjustable by a multiturn encoder, usually constitute a subset of such possible parameters.

The operating parameters of the sensor can be chosen from a group comprising one or more of the following possible parameters combined among themselves, analysed in detail below:

a trigger threshold that determines sensor sensitivity; a hysteresis threshold range that permits a safety margin against false switches of the sensor; a light/dark parameter; a cut-off distance and a background distance; a light emission intensity of an emitted light beam; an output type, whether NPN or PNP, of an output information signal; an activation delay mode of the output information signal and timing of the activation delay; a luminous emission intensity of the luminous indicators on the sensor.

Trigger Threshold

The trigger threshold parameter determines the sensitivity threshold of the sensor. For example, an optoelectronic sensor comprises a photoemitter suitable for emitting a light beam in a specific direction for detecting objects and a photoreceiver for receiving at least partially, the light beam reflected by an object. By means of the trigger threshold parameter the output is activated when the intensity of the reflected light beam exceeds the value set as a threshold.

The controlling means is able to detect a rotation speed of the encoder. In this manner, at a rotation speed of the knob 22 beyond a preset speed threshold value, a setting is associable with a first "coarse" sensitivity that at each adjusting step permits great variations of the parameter to be adjusted, namely of the trigger threshold; with a second rotation speed of the knob 22 below the preset speed threshold value a setting with a second "fine" sensitivity is associable that thus permits small variations of the parameter to be adjusted at each adjusting step.

Hysterisis Threshold Range

The hysterisis threshold range parameter is defined by two distinct parameters that are associated with one another inasmuch as they relate to the same type of setting and thus a parameter that defines a lower hysterisis threshold and a further parameter that defines an upper hysterisis threshold. The hysterisis range defines a range of values that comprises the trigger threshold that determines a margin of safety against false activations of the sensor that are due to very fast variations of the light beam reflected around the trigger threshold.

The controlling means is able to detect a rotation direction of the multiturn encoder 28. In this manner, with a rotation mode of the knob 22 and thus the rotation of the knob for example to the right a setting of the upper hysterisis threshold is associable, and thus of the predetermined parameter, whereas with a rotation of the knob 22 to the left a setting of the lower hysterisis threshold is associable, and thus of a further predetermined parameter. Adjustment of the parameter or of the further parameter is selectable on the basis of the rotation mode of the knob 22 and can be for example validated by preset interval of inactivity of an operator after a complete rotation of a revolution of the knob 22. Alternatively, it can also be validated by a limit end position to the right or to the left maintained by an operator for a preset interval of time.

In addition, the controlling means is also suitable for detecting, not only a direction but also a rotation speed of the knob 22. What was said previously about the setting mode of the trigger threshold thus continues to be valid inasmuch as it is possible to set both the lower hysterisis threshold and the upper hysterisis threshold by a "coarse" or "fine" sensitivity setting.

The setting mode of the parameter or of the further parameter is alternatively selectable on the basis of the rotation direction of the knob 22, after validation of the selection of the parameter or of the further parameter.

Light/Dark

Also this parameter is settable by a multiturn encoder, although a selector like the light/dark selector 23 is usually dedicated thereto.

By detecting the rotation direction of the multiturn encoder 28, the means for controlling is suitable for associated a specific setting of the light/dark parameter in light or dark mode. In the case of adjustment by multiturn encoder, the light/dark selector 23 shown in FIG. 2 could be eliminated.

Cut-Off Distance

The cut-off distance parameters, as already described previously, is of interest in the case of a background suppression sensor and enables a position to be adjusted in a detecting space of the sensor the output of which is activated if said position is reached by the object.

For the adjusting mode of the cut-off distance, refer to the adjusting mode of the sensitivity threshold, in which the rotation speed of the knob 22 is detected.

A further parameter that defines the distance in which the background is positioned is associable with the cut-off distance parameter.

For the adjusting mode of both the cut-off distance and the background distance reference is made to the adjusting mode of the hysterisis threshold range, in which the rotation direction for selecting the parameter or the further parameter to be adjusted is detected and in which the rotation speed of the knob 22 for detecting the parameter validated by a first or a second sensitive is also detected.

Emission Intensity of an Emitted a Light Beam

The parameter in question adjusts the intensity of the emitted light beam. The optoelectronic sensor comprises a specific circuit for controlling the emitted beam, which is isolated from the reception and amplification circuit of the light beam received. The separation between the emission and reception circuits enables the sensor to be more immune to disturbances. For the adjustment of this parameter, see what have already been said about adjusting the sensitivity threshold of the sensor.

NPN or PNP Output Type

The parameter in question enables the type of output signal of the sensor, whether NPN or PNP, to be selected.

To select the setting mode of the parameter, see what has been said above about setting the light/dark parameter.

Activation Delay Mode of the Output and Activation Delay Time of the Output

Some optoelectronic sensors are installable in control systems that have as a requirement a delay in the activation of the output information signal. This activation mode of this delay and the activation delay of the output are two parameters that are associated with one another and are alternatively selectable and settable.

The output activation delay mode parameter is configurable and can have one of the following values.

Delay ON: the output information signal is activated after a certain time from the moment in which the object is detected;

Delay OFF: the output information signal is activated at the moment in which the object is detected and is deactivated after a certain lapse of time during which the sensor no longer detects the object.

Delay ON/OFF: the output information signal is activated after a certain time from the moment in which the object is detected and is deactivated after a certain lapse of time during which the sensor no longer detects the object;

One Shot: the output information signal is activated at the moment in which the object is detected and is deactivated after a certain lapse of time, regardless of the presence or absence of the object in the detection range of the sensor.

The activation delay time of the output is on the other hand a further parameter that is adjustable owing to the multiturn encoder 28 also for long periods, in a very precise manner.

The previous remarks on the hysterisis threshold range also apply to setting the delay mode and the delay time. The activation delay mode of the output and the output activation delay are alternatively selectable and settable on the basis of the rotation mode of the knob 22.

Luminous Intensity of the Luminous Indicators

With each light emitter, which is usually a LED, located in the optoelectronic sensor a respective parameter can be associated to set the emitted luminous intensity. Again, the previous remarks on the sensitivity threshold of the sensor also apply to the setting mode.

As is clear in FIG. 2, the knob 22 is made as a single body with a pin 29 that is substantially coaxially with the axis A of the knob 22, which is suitable for engaging in a hollow seat 30 obtained in the body of the multiturn encoder 28 to drive the encoder 28 during the rotation of the knob 22. The pin 29 has a shaped profile, conjugated to the profile of the hollow seat 30 in which it is engageable and is provided with a free end 29a and with a body 29b, said body 29b extending from the knob 22 to the free end 29a. The knob 22 and the pin 29 are made as a single body by injection-moulded plastics.

It should be noted that the knob 22 comprises a shaped external part 22a that is graspable by an operator and an internal fixing part 22b, joined as a single body to the pin 29, that is substantially cylindrical and is of smaller dimensions than the dimensions of the external part 22a. The internal part 22b is insertable for fixing in an opening 31 of the face 20, in which an annular seat 32 is provided for being able to house a sealing gasket 33 of OR type with which the internal portion 22b of the knob 22 is provided. The sealing gasket 33 ensures in a simple manner hermetic sealing protection meeting the requirements of standard IP 67.

The sensor further comprises a monoturn trimmer 34 provided with a cross-shaped through seat 35 suitable for receiving a respective shaped pin 36, made as a single body with the light/dark selector 23, the profile of which is conjugated to the shaped seat 35 of the monoturn trimmer 34. The selector 23 is provided with a shaped external part 23a that is graspable by an operator and with an internal part 23b, made as a single body with the respective pin 36 and insertible for fixing into a further opening 37 made in the face 20. Also the selector 23 and the respective pin 36 are made as a single body by injection moulding of plastics.

Similarly to what has been said for the knob 22, the seal IP 67 is ensured by a gasket 38 with which the internal portion 23b of the selector 23 is provided, that is suitable for being housed in a respective annular seat 39 of the further opening 37.

The face 20 is additionally provided with still further openings 40 and 41 suitable for receiving respective plastic housings 24a and 25a of the light emitters 24 and 25.

The sensor further comprises electric coupling means made by a single printed circuit board PCB 42 on which are mounted the multiturn encoder 28, the monoturn trimmer 34 and four LEDs for PCB mounting 43a, 43b, 43c and 43d. It should be noted that the LEDs 43c and 43d are coupled with the plastic housings 24a and 25a whilst the LEDs 43a and 43b are arranged at the shaped transparent zones as arrows 26 and 27. Further joint plastic housings are provided between the arrows 26 and 27 and the LEDs 43a and 43b, which are not shown in FIG. 3. The housing joint 27a is shown only in FIGS. 4 and 5.

In use, it is supposed that the optoelectronic sensor is of a first type intended for a first specific application, which requires the trigger threshold to be set by an operator.

In one initial configuration step, the optoelectronic sensor is configured so that the trigger threshold is the predetermined parameter among the possible parameters that is adjustable by the knob 22. The controlling means configures the multiturn encoder to enable correct adjustment of the trigger threshold and thus sets the configurable parameters of the multiturn encoder 28 and thus the most suitable number of revolutions and number of adjusting intervals that are associable with the trigger threshold parameter. The configurable parameters of the multiturn encoder 28 can be stored in a mass memory of the sensor or be received by the external automation system.

During the operating step, if an operator rotates fast, i.e. at a speed above a preset speed threshold, the driving knob 22 of the multiturn encoder 28 a trigger threshold with coarse sensitivity is set. For example, at each adjusting interval the trigger threshold moves by 5 cm. On the other hand, if the operator moves the knob 22 slowly, ie. at a speed below the preset speed threshold, the trigger threshold with fine sensitivity is set. For example, at each adjusting interval the trigger threshold moves by 5 cm.

On the other hand, if it is supposed that the optoelectronic sensor is of a different type, intended for a second specific application, said sensor requires a setting of the cut-off distance by an operator, inasmuch as the optoelectronic sensor is a sensor with background suppression.

In one initial configuration step, the controlling means suitably configures the multiturn encoder to enable correct adjustment of the cut-off distance and of the background distance and then sets the most suitable number of revolutions and most suitable number of adjusting intervals, which are associable with the cut-off distance parameters and the background distance parameters associated with one another. The previous remarks apply to the configurable parameters of the multiturn encoder 28.

During the operating step, rotation of the knob 22 to the right or to the left enables an operator to set the cut-off distance or the background distance and thus enable the selection of which parameter of the two parameters that is to be alternatively adjusted. To confirm the adjustment of the cut-off distance parameter or of the background distance further parameter, it is sufficient for an operator to maintain the knob 22 rotated in the limit end position, for example for more than 3 seconds. Subsequently, the rotation speed of the knob 22 permits coarse or fine setting of the parameter.

Owing to the presence of the multiturn encoder 28, it is thus possible to have a single configuration of the face 20 of the sensor with a panel function for interaction with an operator per many types of different optoelectronic sensors, inasmuch as the adjusting means of the operating parameters of the sensor are standardised.

The presence of the multiturn encoder 28 permits great flexibility of use at low costs because it ensures adjustment of a parameter in any interval of values with the required adjustment sensitivity. Further the reduced overall dimensions of the multiturn encoder 28 are such as to ensure standardisation not only of the electronic components but also of the external container of the sensor. This enables several types of optoelectronic sensors to be made by means of installing a single type of multiturn encoder and suitably configuring only the configurable parameters thereof. Standardisation of the electronic components is made possible with significant cost reduction, above all from the point of view of an industrial production of many different types of sensor.

Preferably, in order to ensure a more precise drive, the hollow seat 20 of the multiturn encoder 28 is a through hollow seat and then the pin 29 is provided with a free end 29a that protrudes from the multiturn encoder 28 on the side opposite the knob 22 and the suitably perforated PCB (not shown) to which the multiturn encoder is fixed. In this manner, the multiturn encoder 28 is thus entirely traversed by the pin 29 and this coupling, which occurs over the entire thickness of the multiturn encoder 28 between the shaped portions of the pin 29 and of the hollow seat 30 ensures reliability and mechanical robustness in sweeping.

Figure 4:
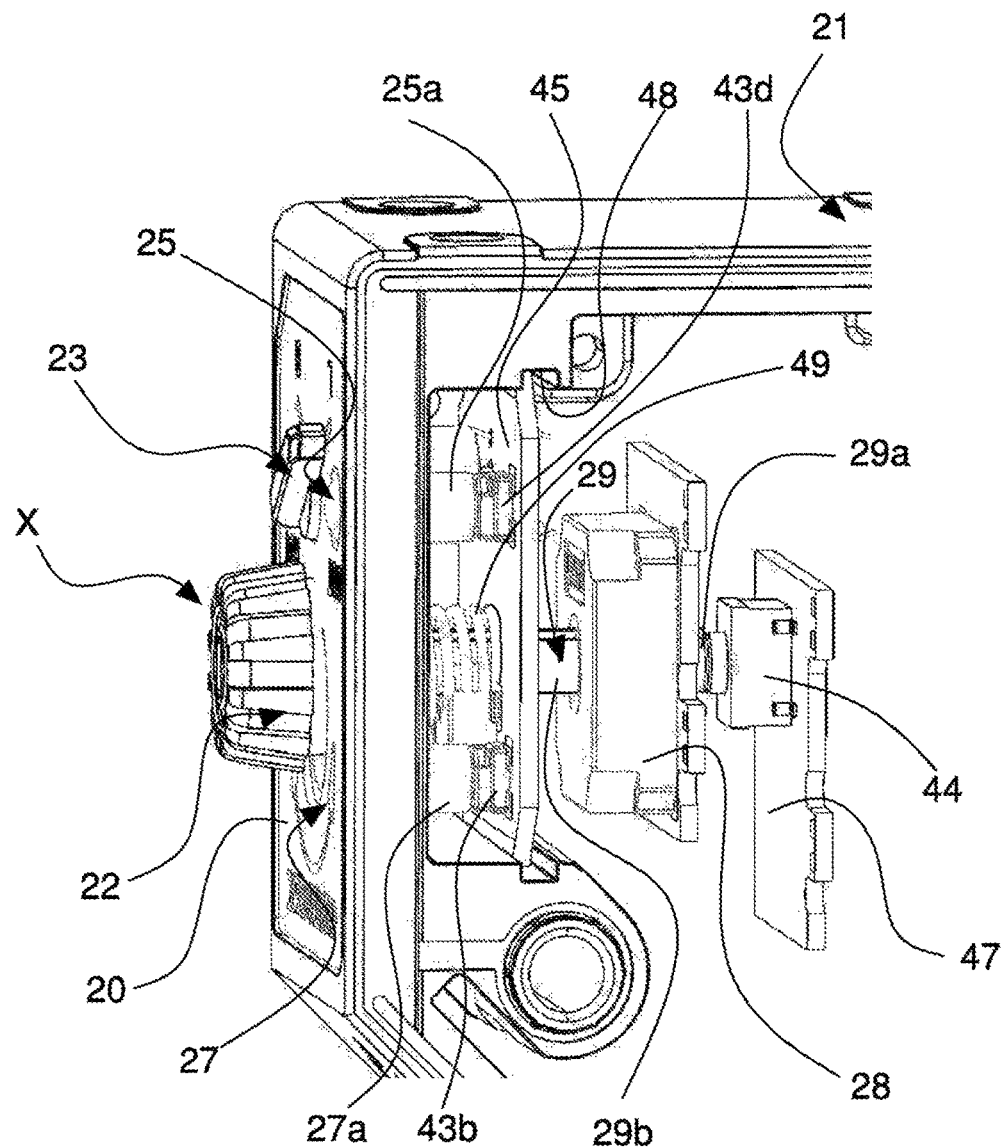
FIG. 4 shows a perspective side view with parts removed for clarity of an embodiment of the optoelectronic sensor according to the invention.

According to one embodiment of the optoelectronic sensor according to the invention, shown in FIG. 4, the knob 22 and the pin 29 are axially slidable, the hollow seat 30 of the multiturn encoder 28 is a through hollow seat.

The free end 29a of the pin 29 faces a tactile switch 44, so that the knob 22 is actuatable by pressure from an operator between a rest position X in which the free end 29a is far from said tactile switch 44, even by only a few mm, and a depressed position, which is not shown, in which said shaft is in contact and presses the tactile switch 44.

The knob 22 thus acts as a pushbutton, the pressure of an operator being recognisable by the controlling means connected to this tactile switch.

The sensor further comprises electronic coupling means made by three further PCBs, i.e. an external printed circuit board 45, an intermediate circuit board 46 and an internal circuit board 47 on which are respectively welded the LEDs for PCB mounting 43a, 43b, 43c and 43d, the multiturn encoder 28 and the tactile switch 44.

The external printed circuit board 45 and intermediate circuit board 46 have respective openings for receiving the pin 29 that then traverses in order the external printed circuit board 45, the multiturn encoder 28 and the intermediate circuit board 46 to which the multiturn encoder 28 is fixed. The external printed circuit board 45 arranged towards the face 20, the internal circuit board 47 positioned inside the container of the sensor and intermediate circuit board 46 positioned between the external printed circuit board 45 and the internal circuit board 47, are arranged parallel to one another, at a distance that is suitable for respecting the thickness of the electronic components, i.e. the overall dimensions of each component transversely to the board to which it is welded. It should be noted that in FIG. 4 only the external printed circuit board 45 to which the LEDs 43a-43d are welded is fixed to the external container 21 of the sensor, on guides 48 obtained therein. Fixing the intermediate circuit board 46 on which the multiturn encoder 28 is arranged and the fixing of the intermediate circuit board 47 on which the tactile switch 44 is fixed are not shown in FIG. 5, inasmuch as they also depend on all the further optical and/or electronic components that are part of the sensor and are not relevant for the purposes of the present invention.

The external printed circuit board 45 mounting the LEDs 43a-43d is thus interposed between the face 20 and the multiturn encoder 28.

The sensor further comprises elastic means, for example a spring 49 the ends of which are fixed on one side to the external printed circuit board 45 and on the other to the knob 22.

For fixing the spring 49, it is pointed out that it is not necessary for this spring 49 to be fixed to the external printed circuit board 45. If the presence of the LEDs 43a-43d is not required, the spring could be fixed to supporting means, for example a supporting plate, which is not shown, in replacement of the external printed circuit board PCB 45.

Inside the spring 49 the pin 29 is positioned slidably arranged coaxially to the spring 49 to maintain the knob 22 distant from the face 20 in the rest position X and restore this rest position at the end of the pressing of the knob 22 by the operator.

With the knob 22 that also acts as a pushbutton a plurality of parameters is associable that are selectable alternatively among the operating parameters of the sensor, in relation for example to the number of pressing that the operator gives or to the duration of a given pressing of the knob 22. By selecting a predetermined parameter among the plurality of operating parameters associable with the knob 22, the predetermined parameter is adjusted as illustrated previously.

For example, each pressing of the knob could select a different parameter, established according to a preset cycle order.

In use, the optoelectronic sensor is configured so that with the knob 22 the plurality of predetermined operating parameters are associated and for each operating parameter the corresponding configurable parameters of the multiturn encoder 28 are stored, i.e. the number of revolutions and number of adjusting intervals for each revolution, which define the correct adjustment of each operating parameter.

In a subsequent operating step, at each press of the knob a different operating parameter to be adjusted is selected and for each parameter the controlling means configures the multiturn encoder 28 with the configurable parameters corresponding to the operating parameter selected by pressing. The previous remarks on the setting of each operating parameter remain valid.

Thus owing to the further pushbutton function assigned to the knob it is possible for the operator to set during the operating step a preset number of operating parameters of the sensor. In addition to the advantages due to the presence of the multiturn encoder 28, several parameters are adjustable with a single knob 22 and this ensures still greater flexibility of use and a configuration of the functions of the sensor that is ever more precise.

Figure 5:
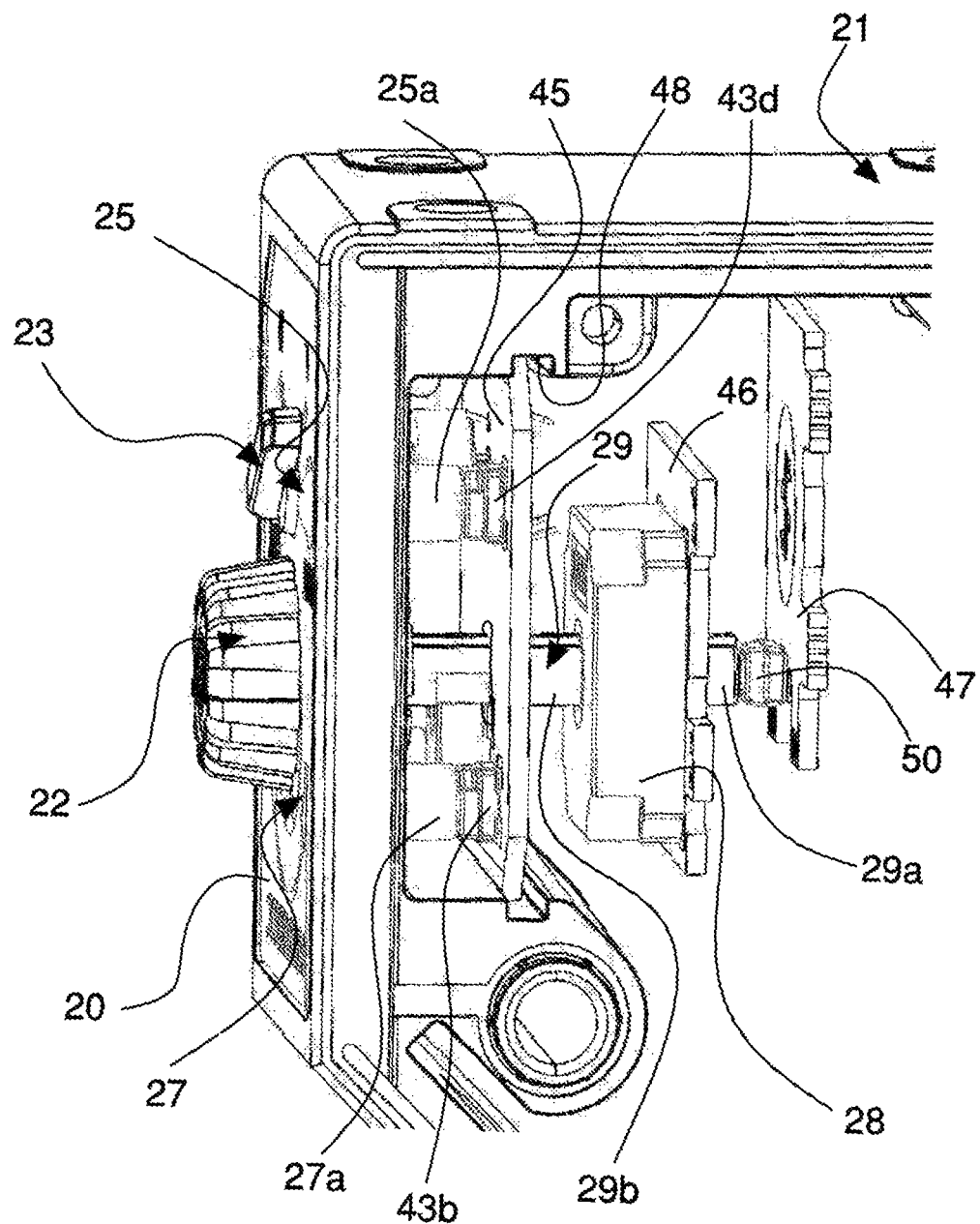
FIG. 5 shows a perspective side view with parts removed for clarity of a further embodiment of the optoelectronic sensor according to the invention.

According to a further embodiment of the optoelectronic sensor according to the invention, shown in FIG. 5, the knob 22 and the pin 29 are made of transparent material, the hollow seat 30 of the multiturn encoder 28 is a through hollow seat and the pin 29 is suitable for being illuminated by a light source 50 coupled therewith, connected to the controlling means and actuatable thereby to illuminate the pin 29 and the knob 22 during use of the sensor. In detail, the free end 29a of the pin 29 faces the light source 50, for example a LED light source, which is welded to the third printed circuit board 47 and is positioned in such a manner as to be substantially on the same axis A as the knob and the pin 29. The light source 50 can be of one or more colours.

Figure 3:
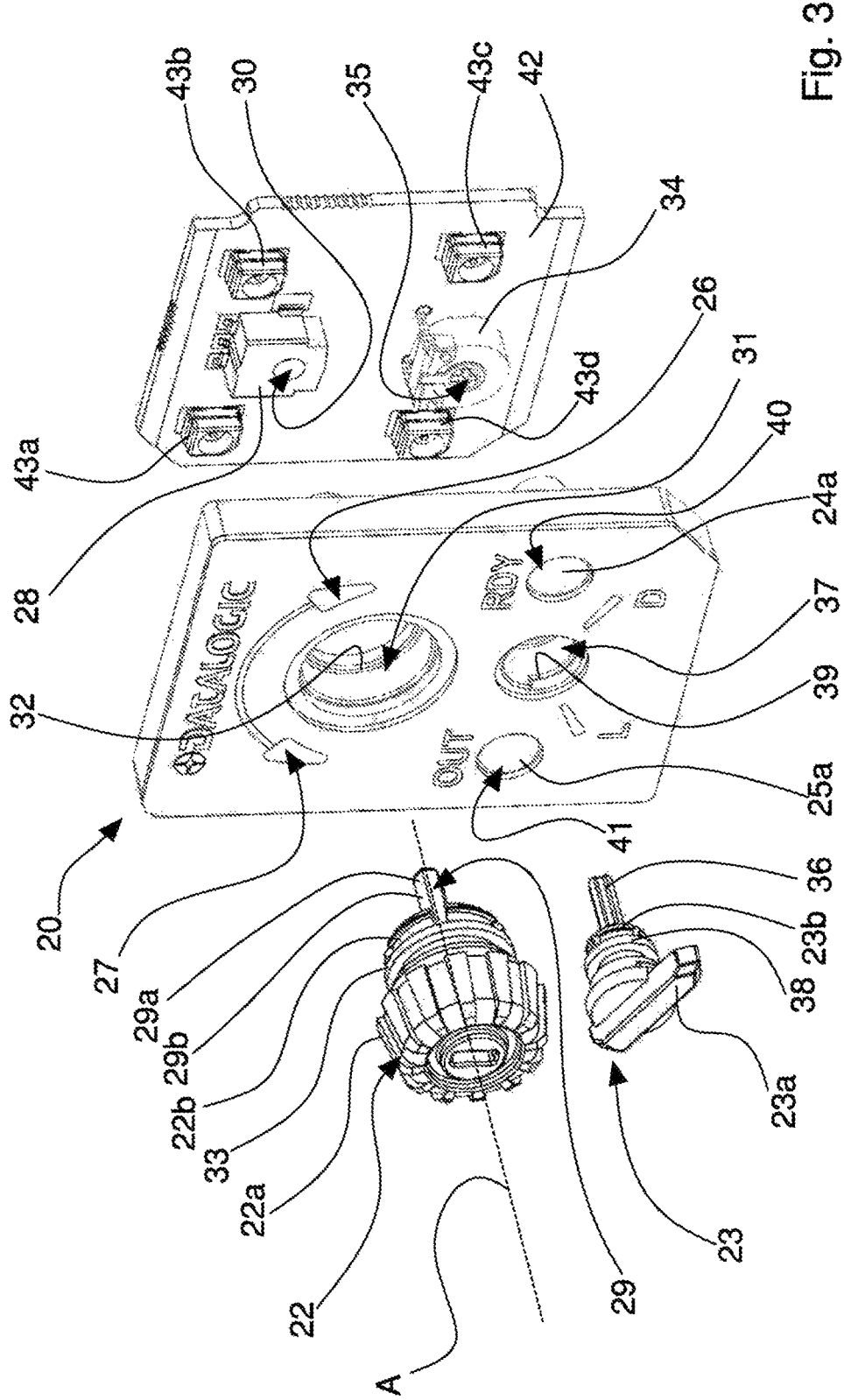
FIG. 3 shows a perspective exploded view of a part of the optoelectronic sensor, in particular of the face acting as an operator panel and of a printed circuit board on which a multiturn encoder and a monoturn trimmer are positioned.

The knob 22, and consequently the pin 29 made as a single body with the knob 22, is fixed to the face 20 of the sensor similarly to what has been said for the embodiment of FIG. 3.

In use, in one initial configuration step, the optoelectronic sensor is configured so that a predetermined parameter among the possible parameters is adjusted by the knob 22. The means for controlling sets the operating parameters of the multiturn encoder 28, similarly to what has already been said with reference to FIG. 3. If the trigger threshold is the parameter that is settable by the knob 22, with the "coarse" setting mode a first light indication can be associated, for example of a first colour, whereas with the "fine" setting mode a second light indication can be associated, for example of a second colour.

By arranging the light source 50 facing the free end 29a of the pin 29 and by making the knob 22 and pin 29 connected thereto of transparent or semitransparent material, it is possible to ensure that the knob 22 becomes an additional visual indicator without the need to modify the optoelectronic sensor.

In this manner, it is possible to provide the optoelectronic sensor with a further luminous indicator and it is for example possible to associate with each setting mode of the adjusted parameter a corresponding lighting mode of the knob 22, without the need to increase the number of dedicated light emitters on the face 20. Owing also to the possibility of having a light source with one or more colours, it is possible to make a great number of distinct visual signals, based for example both on the flashing frequency and on the colour. The number of visual indicators, normally two, usually always present in an optoelectronic sensor could be thus reduced.

According to a still further embodiment, shown in FIG. 6, the sensor comprises the axially slidable knob 22 and pin 29, the elastic means 49 and the tactile switch 44, the hollow seat 30 is a through hollow seat and the knob moreover performs the further function of luminous indicator, according to what has already been described with reference to FIG. 4.

The knob 22 and the pin 29 are in fact made of transparent material and the pin 29 is suitable for being illuminated by the light source 50 coupled therewith, connected to the controlling means and actuatable thereby to illuminate the pin 29 and the knob 22 during use of the sensor. Nevertheless, the light source 50 is not on the same axis as the pin 29 the tactile switch 44 that is coaxial with the pin 29 being present, but it is welded on the third printed circuit board 47 misaligned with respect to the pin 29.

The sensor further comprises a light guide 51 arranged for receiving light radiation emitted by the light source 50 and suitable for illuminating the body 29b of the pin 29. The light guide 51 is provided with at least two branches, that are tilted in relation to one another in an appropriate manner, a first end branch 51a of which facing the light source 50 and a second end branch 51b facing the body 29b of the pin 29. The number of branches of the light guide, two or a plurality, depends on the positioning of the body 29b of the pin 29 with respect to the light source 50.

It is noted that the body 29b of the pin 29 comprises portions that are accessible for positioning the second end branch 51b of the light guide and portions that are on the other hand not accessible because they are received inside electronic components, such as, for example, the portion received in the seat 30 of the multiturn encoder 28.

For example, the free end 51b is positionable in the accessible portion comprised between the intermediate circuit board 46 and the free end 29a or between the face 20 of the device and the external printed circuit board 45, if the light source 50 is positioned and welded on the external printed circuit board 45. The presence of the light guide 51 enables the light source 50 to be positioned not only on the external printed circuit board 45 or internal printed circuit board 47, as illustrated previously, but also in a different position inside the container 21 of the sensor, according to a preferred design arrangement, provided that the end of the second branch of the light guide is coupled with an accessible portion of the body 29b of the pin 29.

The light guide 51 in this manner conveys the light of the light source 50 onto the pin 29, which in turn illuminates the knob 22.

The previous remarks on the embodiment in FIG. 4 and the embodiment in FIG. 5 apply to the configuration of the operating parameters of the sensor that are associable with the knob and of the corresponding operating parameters of the multiturn encoder 28 that is settable by the controlling means, and these previous remarks are not repeated here. In fact, the embodiment shown in FIG. 6 includes in the knob 22 both the additional functions of pushbutton and of luminous indicator.

In this manner, the advantage of having great flexibility of use and setting precisions of one or two operating parameters that are correlated with one another that is due to presence of the multiturn encoder 28 that is actuatable by the knob 22, is further increased by the possibility of setting with the knob 22 several different operating parameters and by the possibility of having at least one additional visual indicator by means of the knob 22. By including in the same knob 22 both the adjusting means for adjusting operating parameters of the sensor and the indicating means it is thus possible to obtain a high-performance optoelectronic sensor at low costs and with compact dimensions.

What is claimed is:

1. An optoelectronic sensor for detecting one or more features of an object, comprising:
    means for controlling the operation of said optoelectronic sensor and a face for interaction with an operator provided with adjusting means for adjusting operating parameters of said optoelectronic sensor, wherein said optoelectronic sensor detects the one or more features of the object and communicates with an external automation system via the control means that is configured for receive data reading requests from the optoelectronic sensor and requests for setting data in the optoelectronic sensor;
    said control means being connected to said adjusting means to detect a setting of said operating parameters, wherein said adjusting means comprises a knob, which is rotatable around an axis (A) for adjusting at least one predetermined parameter among said operating parameters, characterized in that said optoelectronic sensor comprises a multi-turn encoder that is actuatable by said knob and that said control means is connected to said multi-turn encoder to obtain a rotation mode of said knob, wherein the rotation mode includes at least one of a rotation direction or a rotation speed, so as to associate with said detected rotation mode a corresponding setting mode of said predetermined parameter, wherein the corresponding setting mode includes at least one of a setting with a first coarse sensitivity, or a second fine sensitivity, and wherein said knob is fixed to an elastic means.

2. The optoelectronic sensor of claim 1, wherein said optoelectronic sensor is configurable for adjusting by said knob a further predetermined parameter among said operating parameters of said optoelectronic sensor, associated with said predetermined parameter, said adjusting of said predetermined parameter or of said further predetermined parameter being selectable alternatively by means of said rotation mode of said knob.

3. The optoelectronic sensor of claim 2, wherein said multi-turn encoder is further provided with a hollow seat and said knob is made as a single body with a pin that is suitable for engaging in said hollow seat to drive said multi-turn encoder during said rotation of said knob.

4. The optoelectronic sensor of claim 1, wherein said multi-turn encoder is further provided with a hollow seat and said knob is made as a single body with a pin that is suitable for engaging in said hollow seat to drive said multi-turn encoder during said rotation of said knob.

5. The optoelectronic sensor of claim 4, wherein said hollow seat is a through hollow seat and said pin is provided with a free end that protrudes from said multi-turn encoder on a side opposite said knob, said multi-turn encoder being entirely traversed by said pin.

6. The optoelectronic sensor of claim 5, wherein said knob and said pin are further made of a transparent material and said pin is suitable for being illuminated by a light source coupled therewith that is actuatable by said control means to illuminate said knob during a use of said optoelectronic sensor.

7. The optoelectronic sensor of claim 6, wherein each setting mode of said parameter is associated with a corresponding lighting mode of said knob.

8. The optoelectronic sensor of claim 7, wherein said free end of said pin faces said light source for providing said coupling.

9. The optoelectronic sensor of claim 6, wherein said free end of said pin faces said light source for providing said coupling.

10. The optoelectronic sensor of claim 6, wherein said light source is misaligned with respect to a longitudinal axis (A) of said pin and said optoelectronic sensor comprises a light guide arranged for receiving a light radiation emitted by said light source and suitable for illuminating a body of said pin between said knob and said free end.

11. The optoelectronic sensor of claim 10, wherein said light guide is provided with at least two end branches for conveying said light and providing said coupling between said light source and said pin, a first branch facing said light source and the second branch facing an accessible portion of said body of said pin.

12. The optoelectronic sensor of 5, wherein said knob and said pin are further axially slidable and said free end faces a tactile switch, said knob being actuatable through pressure by an operator between a rest position (X), wherein said free end is far from said tactile switch, and a depressed position (Y), wherein said free end is in contact and presses said tactile switch.

13. The optoelectronic sensor of claim 12, further comprising:
    supporting means including an external printed circuit board fixed to said container and interposed between said face and said multi-turn encoder; and
    the elastic means interposed between said supporting means and said knob for maintaining said knob far from said face in said rest position and restoring said rest position at the end of pressing by said operator.

14. The optoelectronic sensor of claim 13, wherein a plurality of predetermined parameters is associated with said knob, each predetermined parameter is at least one of:
    1) being selectable alternatively from said operating parameters of said optoelectronic sensor in relation to at least one of a number of pressing of said knob on said tactile switch, or a duration of the pressing of said knob on said tactile switch; or
    2) being selectable by said rotation mode of said knob.

15. The optoelectronic sensor of claim 12, wherein a plurality of predetermined parameters is associated with said knob, each predetermined parameter is at least one of:
    1) being selectable alternatively from said operating parameters of said optoelectronic sensor in relation to at least one of a number of pressing of said knob on said tactile switch, or a duration of the pressing of said knob on said tactile switch; or
    2) being selectable by said rotation mode of said knob.

16. The optoelectronic sensor of claim 4, wherein said knob and said pin are further made of a transparent material and said pin is suitable for being illuminated by a light source coupled therewith that is actuatable by said control means to illuminate said knob during a use of said optoelectronic sensor.

17. The optoelectronic sensor of claim 16, wherein each setting mode of said parameter is associated with a corresponding lighting mode of said knob.

18. The optoelectronic sensor of claim 1, wherein said operating parameters are selectable from a group comprising one or more of the following possible parameters in combination: a trigger threshold that determines sensor sensitivity; a hysteresis threshold range, defined by a lower hysteresis threshold associated with an upper hysteresis threshold that determines a safety margin against false activation of The optoelectronic sensor; a light/dark parameter; a cut-off distance and a background distance, associated to said cut-off distance; a light emission intensity;

an output type, whether sinking (NPN) or sourcing (PNP) of an information signal of said optoelectronic sensor;

an activation delay mode of said output; and an activation delay time of said output.

19. The optoelectronic sensor of claim 18, wherein a number of turns and a number of intervals for each turn are configurable parameters of said multi-turn encoder stored in said control means, said configurable parameters of said multi-turn encoder being settable by said control means.

20. The optoelectronic sensor of claim 19, wherein respective configurable parameters of said multi-turn encoder are associated with each operating parameter of said optoelectronic sensor.

21. An optoelectronic sensor for detecting one or more features of an object, comprising:

means for controlling the operation of said optoelectronic sensor and a face for interaction with an operator provided with adjusting means for adjusting operating parameters of said optoelectronic sensor, wherein said optoelectronic sensor detects the one or more features of the object;

said control means being connected to said adjusting means to detect a setting of said operating parameters, wherein said adjusting means comprises a knob, which is rotatable around an axis (A) for adjusting at least one predetermined parameter among said operating parameters, characterized in that said optoelectronic sensor comprises a multi-turn encoder that is actuatable by said knob and that said control means is connected to said multi-turn encoder to obtain a rotation mode of said knob, so as to associate with said detected rotation mode a corresponding setting mode of said predetermined parameter, and wherein said knob is fixed to an elastic means.

* * * * *